Dec. 1, 1959   W. E. O'SHEI   2,914,988
REAR VIEWING MIRRORS
Filed Nov. 21, 1955
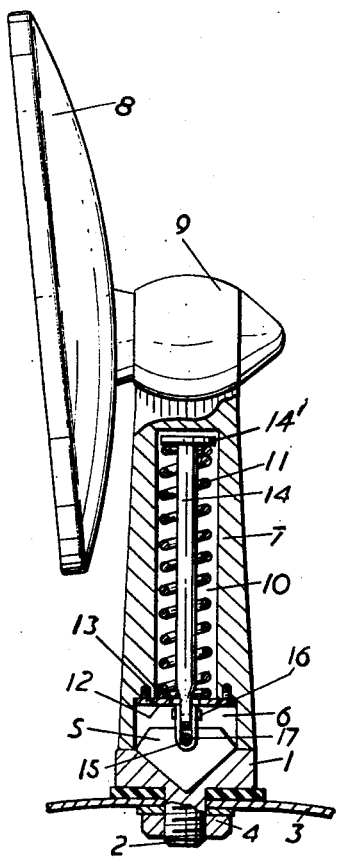
Inventor
William E. O'Shei
By
Attorneys

2,914,988

REAR VIEWING MIRRORS

William Edward O'Shei, London, England

Application November 21, 1955, Serial No. 547,975

Claims priority, application Great Britain
November 22, 1954

2 Claims. (Cl. 88—98)

The present invention relates to a rear viewing mirror in which the mirror is supported by means of a flexible joint which, on the mirror being accidentally pushed or hit, allows the parts of the joint to turn and/or rock relatively to one another from the predetermined located position in which the parts of the joint normally interengage.

In a known construction, the two parts of the joint are resiliently urged together by a spring which extends below the base member by which the complete mirror assembly is adapted to be secured to a vehicle. For fitting such a mirror to a vehicle, a relatively large hole has to be drilled in the vehicle wing, or other part of the vehicle to which the mirror is to be attached, in order to permit the spring to pass therethrough.

The present invention has for its object to provide a modified construction which does not require such a large hole for fixing the mirror assembly to the vehicle, and in which the spring does not project beneath the base member, thereby making the mirror assembly more compact and easier to fit.

To this end, according to the invention, the spring or other resilient means for urging the two parts of the flexible joint together is located in a cavity in the support or stanchion by which the mirror is supported from the base member. The base member can thus be secured to the vehicle body without having to provide a large hole to accommodate the spring. The base member can be secured to the vehicle by screws, bolts, one or more threaded spigots on the base member or by any other convenient means.

An embodiment according to the invention is illustrated by way of example, in the accompanying drawing, which shows a side view of the mirror assembly partly in cross-section.

Referring to the drawing, the base member 1 is provided with a threaded spigot 2 by which it can be secured to the vehicle body 3 by the nut 4. The upper surface of the base member is formed with a pyramidal projection 5 of rectangular cross-section which fits within a rectangular recess 6 formed in the bottom of the stanchion 7, to the upper end of which is secured the mirror 8 through an adjustable connection 9 which can be locked in the adjusted position. The stanchion 7 is provided with a bore 10 extending upwardly from the recess 6, in which is accommodated the compression spring 11. The spring is retained in the bore by an apertured end wall constituted by a plate 12 secured across the lower end of the bore by screws 13. The headed rod 14 engages with its head beyond the upper end of the spring 11 and is connected at its lower end to the base 1 by means of the link 15 which is pivotally connected by the pin 16 to the rod 14 and by the pin 17, which bridges a gap in the projection 5 and lies at right angles to the pin 16, to the base 1, thus forming a universal joint. The rod 14 and the universal joint constitute a coupling member between the base member and the stanchion. The spring is compressed between the head 14' and the plate 12.

The stanchion can thus rock in all directions relative to the axis of the base member and also turn about this axis.

With the arrangement described, the spring is enclosed and protected from mud and dirt.

Whilst a particular embodiment has been described, it will be understood that various modifications may be made without departing from the scope of the invention as defined by the appended claims. For example, the head on the rod 14 may be constituted by a separate part secured to or adjacent the free end of the rod. The plate 12 may also be replaced by any equivalent part, secured to or integral with the stanchion, which forms an abutment for the lower end of the spring 11. Further the universal joint 15, 16, 17 may be replaced by other flexible constructions, for example by a length of flexible cable which may, if desired, replace the rod 14.

I claim:

1. A rear viewing mirror comprising a mirror element, a stanchion, means for mounting the mirror element on the stanchion, a base member, a solid threaded bolt member extending from the central portion of the underside of said base member, by means of which said base member is adapted to be secured to a vehicle body, a flexible joint between said stanchion and said base member comprising interengaging and indexing parts respectively in fixed relationship relative to said stanchion and said base member, a cavity located in said stanchion and extending along the axis of said stanchion for the greater part of its length in a direction away from the base member, an apertured plate member secured over the entrance to said cavity, a coupling member universally connected to the base member and extending into said cavity, an enlarged head portion at the free end of said coupling member, a compression spring surrounding said coupling member, and compressed between the enlarged head at the free end of said coupling member and the plate member which is fixed relative to the stanchion, whereby said spring urges the parts of the flexible joint into positively located abutting relationship but allows the indexing parts of the flexible joint to move relatively to one another against the action of said spring to permit the mirror and the stanchion to rock and to turn relative to the base member.

2. A rear viewing mirror comprising a mirror element, a stanchion, means for mounting the mirror element on the stanchion, a base member, a solid threaded bolt member extending from the central portion of the underside of said base member, by means of which said base member is adapted to be secured to a vehicle body, a flexible joint between said stanchion and said base member comprising indexing parts consisting of a pyramidal projection on said base member and a complementary recess in the bottom of said stanchion, a cavity located in said stanchion leading out of said recess and extending along the axis of said stanchion for the greater part of its length in a direction away from the base member, an apertured plate secured over the mouth of the cavity, a coupling member universally connected to the base member and extending through the aperture in the plate into said cavity throughout substantially its entire length and including a universal joint located in the region where the indexing parts abut one another, a projection at the free end of said coupling member, a compression spring surrounding said coupling member, and compressed between the projection on said coupling member and said plate, whereby said spring urges the parts of the flexible joint into positively located abutting relationship but allows the indexing parts of the flexible joint to move relatively to one another against the action of said spring to permit the mirror and the stanchion to rock and to turn relative to the base member.

References Cited in the file of this patent

UNITED STATES PATENTS

| | | |
|---|---|---|
| 1,599,066 | Rushmore | Sept. 7, 1926 |
| 1,749,868 | Anderson | Mar. 11, 1930 |
| 1,796,093 | Florman | Mar. 10, 1931 |
| 2,141,067 | Miller | Dec. 20, 1938 |
| 2,534,495 | Younghusband | Dec. 19, 1950 |
| 2,724,996 | O'Shei | Nov. 29, 1955 |
| 2,726,575 | Koonter | Dec. 13, 1955 |